US008102550B2

(12) United States Patent
Takeyama

(10) Patent No.: US 8,102,550 B2
(45) Date of Patent: Jan. 24, 2012

(54) IMAGE-FORMING APPARATUS UTILIZING REDUCED SIGNAL LINES

(75) Inventor: Yoshinobu Takeyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1134 days.

(21) Appl. No.: 11/822,217

(22) Filed: Jul. 3, 2007

(65) Prior Publication Data

US 2008/0019710 A1 Jan. 24, 2008

(30) Foreign Application Priority Data

Jul. 7, 2006 (JP) ................................ 2006-187532

(51) Int. Cl.
*G06F 3/12* (2006.01)
*G06F 15/00* (2006.01)

(52) U.S. Cl. ........................................ 358/1.15; 358/1.1

(58) Field of Classification Search ................... 358/1.1, 358/1.9, 1.11, 1.12, 1.13, 1.14, 1.15, 1.16, 358/1.17, 1.18

See application file for complete search history.

(56) References Cited

FOREIGN PATENT DOCUMENTS

JP 2002-258691 9/2002

*Primary Examiner* — Thierry Pham

(74) *Attorney, Agent, or Firm* — Harness, Dickey & Pierce, P.L.C.

(57) ABSTRACT

The image-forming apparatus has a plurality of detectors for outputting detection data comprising detection results of the operating statuses of a plurality of component members constituting the image-forming apparatus, and detection results of various types of detection sensors inside and outside of the image-forming apparatus. Furthermore, the image-forming apparatus is provided with one data line for supplying detection data to an image-forming controller; one identification signal line for supplying an identification signal, which specifies one detector from among the plurality of detectors, from the image-forming controller; one time-interval signal line for supplying a time-interval signal, which specifies a validation time-interval for the identification signal, and a validation time-interval for the detection data; and a detection identification controller, which identifies a pertinent detector based on the identification signal and the time-interval signal, validates only detection data of the identified detector, and supplies the detection data to the image-forming controller via the data line.

7 Claims, 7 Drawing Sheets

IMAGE-FORMING APPARATUS UTILIZING REDUCED SIGNAL LINES

BACKGROUND OF THE INVENTION

1. Field of the Invention

The present invention relates to an image-forming apparatus, which reduces the number of signal lines by placing a plurality of signals on one signal line and carrying out multiplexing.

2. Description of the Background Art

Image-forming apparatuses, such as digital photo copiers, facsimile machines, laser printers and the like, are equipped with numerous detachable units, and these units are provided with sensors as detection means for detecting their respective operating statuses. The detection signals from these sensors are supplied to control means (CPUs and so forth) of an image-forming apparatus, and the signal lines provided for this purpose are quite numerous.

Now then, with image-forming apparatuses being equipped with color capabilities, higher performance and greater functionality, the number of these sensor signal lines has shown a tendency to grow. Further, in addition to detection result signals (data signals), power supplies are also needed to make use of these detection means. Inputting the respective detection signals from this large number of detection means into a CPU or other such image-forming control means requires a large number of signal lines and power lines, and image-forming control means are increasing in size. Further, because image-forming control means are installed in locations that are apart from these units and respective types of detection means, the large number of signal lines, as well as the fact that these signal lines wrap all around inside an apparatus have become big obstacles to making such apparatuses simpler, smaller and less costly.

Accordingly, a number of proposals have been put forward in the past for solving these problems. One such proposal, for example, is Japanese Patent Laid-open No. 2002-258691, in which there is proposed an image-forming apparatus, which provides a detachable unit with an I/O expander connected by a serial bus, and which has control means for identifying the type of a detachable unit by the status of the input port of this I/O expander. In this image-forming apparatus, the number of signal lines connecting a unit with the apparatus main body is reduced by identifying the type of unit in accordance with the status of the input port of the I/O expander.

However, according to this past proposal for an image-forming apparatus, the signal lines for each detachable unit comprise a power line, data line, clock line, and ground line, and when viewed in terms of the apparatus as a whole, signal line reduction is still insufficient. Another problem is that when the system configuration (number of input/output means) changes, suitable control means must be provided, leading to higher costs.

SUMMARY OF THE INVENTION

The present invention is designed to solve for these problems, and an object of the present invention is to provide an image-forming apparatus, which is capable of reducing the vast amounts of image-forming apparatus input lines by placing detection data from a plurality of detection means on a single signal line, and which also possesses the versatility and cost-cutting capabilities to be able to deal with changes in the image-forming system configuration without increasing the number of signal lines by making detection means identification signals redundant.

In an aspect of the present invention, an image-forming apparatus has a plurality of detection means for outputting detection data comprising detection results of the operating statuses of a plurality of component members constituting the image-forming apparatus, and detection results of various types of detection sensors inside and outside of the image-forming apparatus. The image-forming apparatus comprises one data line for supplying the detection data to image-forming control means; one identification signal line for supplying an identification signal, which specifies one detection means from among the plurality of detection means, from the image-forming control means; one time-interval signal line for supplying a time-interval signal, which specifies a validation time-interval for the identification signal, and a validation time-interval for the detection data; and detection identification control means, which identifies a pertinent detection means based on the identification signal and the time-interval signal, validates only detection data of the identified pertinent detection means, and supplies the detection data to the image-forming control means via the data line.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

The embodiments of the present invention will be explained in detail below by referring to the figures.

First, the problems that the present invention is to solve will be explained.

Figure 1:
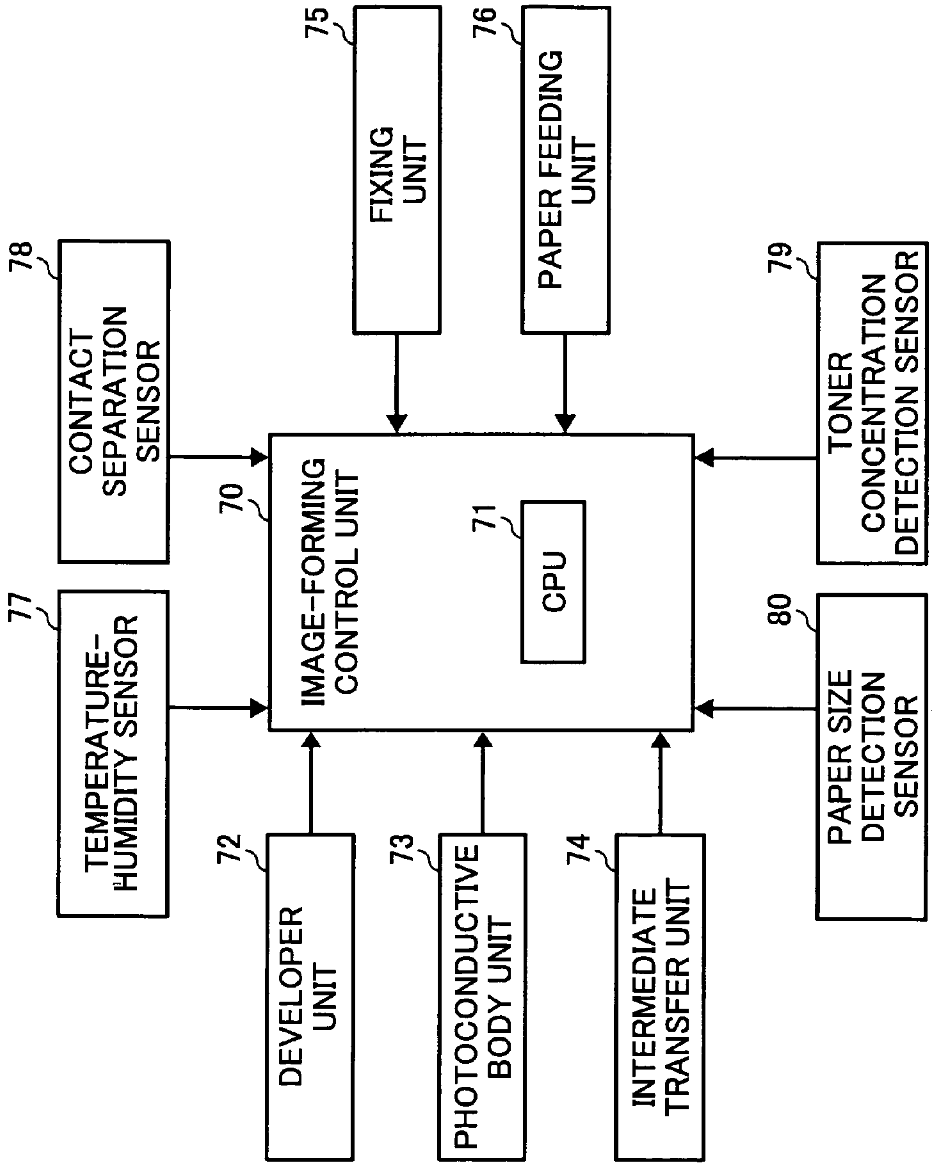
FIG. 1 is a block diagram showing an example of the system configuration for a basic engine of an image-forming apparatus.

FIG. 1 shows an example of the system configuration for the basic engine of an image-forming apparatus. Inside the main body of the apparatus of the image-forming apparatus shown in FIG. 1, a developer unit 72, photosensitive body unit 73, intermediate transfer unit 74, fixing unit 75, and paper feeding unit 76 are connected as a plurality of detachable units to image-forming control means 70, which has a CPU 71. Signals showing the detachable statuses of these detachable units relative to the apparatus main body are each inputted individually as input signals from detection means provided for the respective units. Other input signals include detection signals from detection means such as a temperature-humidity sensor 77 for detecting the temperature and humidity inside and outside the apparatus, a contact-separation sensor 78 for detecting location/status information for a contact-separation mechanism driven at image formation time, as well as a recording medium and the like, and a toner concentration detection sensor 79. Signal lines for a paper size detection sensor 80, which detects the size of a piece of paper, a paper supply cassette sensor and so forth also account for a plurality of bits, and significantly increase the number of signal lines. Although not shown in the figure, there is also a high-voltage source feedback signal. Furthermore, although not shown in the figure, a motor, clutch/solenoid and so froth for driving the mechanical systems are respectively connected to the image-forming control means as output means.

Further, as already mentioned above, using these detection means requires power supplied in addition to detection result signals (data signals). Inputting the respective detection signals from these plurality of detection means into the image-forming control means 70 having CPU 71 requires numerous signal lines and power lines, causing image-forming control means 70 to increase in size. Further, because image-forming control means 70 is installed in a location, which is apart from these detachable units and respective types of detection means, the large number of signal lines, as well as the fact that these signal lines wrap all around inside the apparatus have become big obstacles to making the apparatus simpler, smaller and less costly.

The present invention, which solves for the above-described problems, will be explained in detail hereinbelow.

Figure 2:
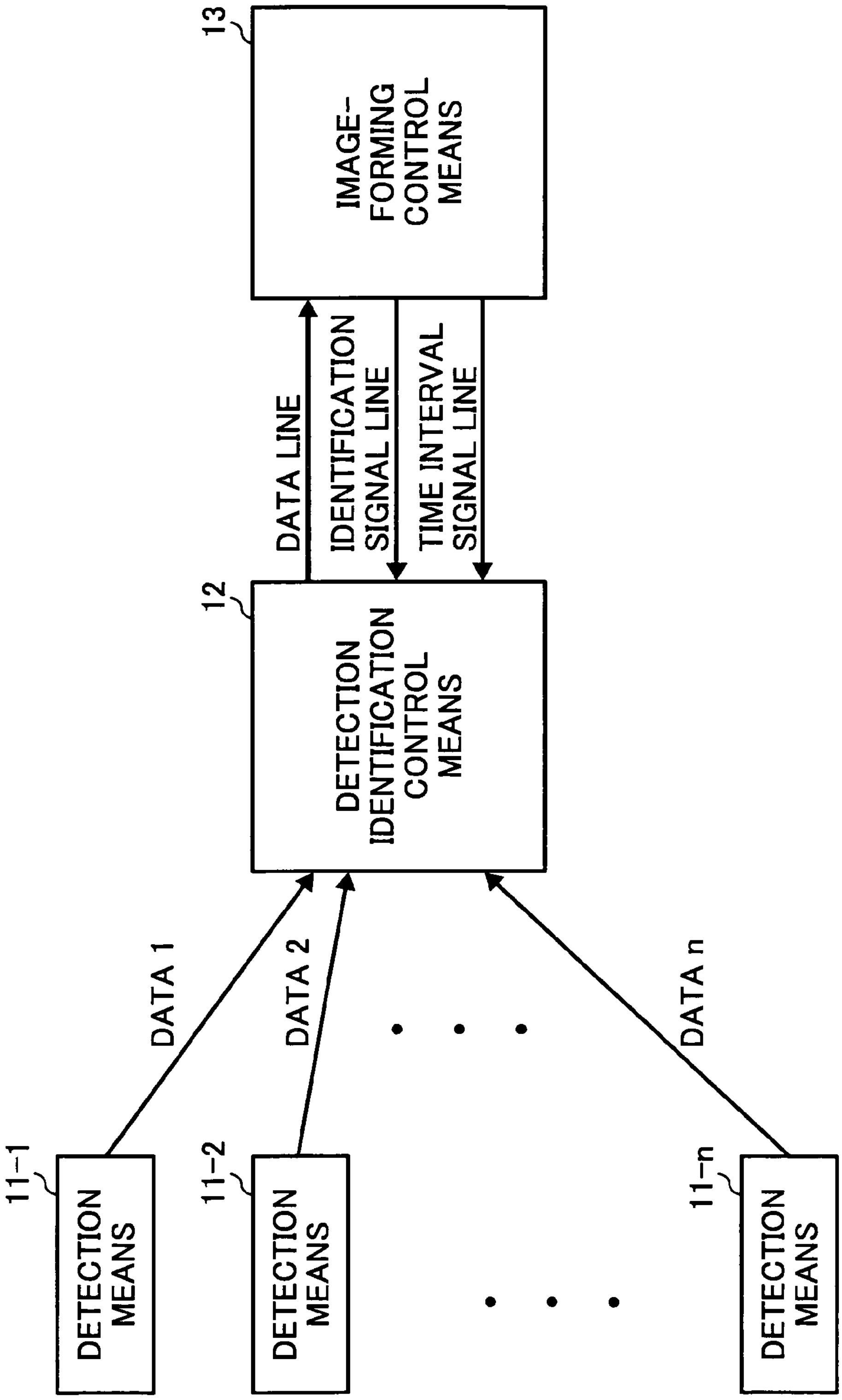
FIG. 2 is a block diagram showing the configuration of a detachable unit detection identification circuit for an image-forming apparatus related to an embodiment of the present invention.

FIG. 2 shows the configuration of a detachable unit detection identification circuit of an image-forming apparatus related to an embodiment of the present invention. As shown in the figure, binary signal (1 or 0) data 1 through n (where n is a positive integer) of results obtained by detecting statuses respectively targeted for detection by a plurality of detection means 11-1 through **11-*n* are inputted to detection identification control means 12 installed in proximity to the plurality of detection means. Although not shown in FIG. 2, power is also supplied to the respective detection means 11-1 through 11-*n* from detection identification control means 12. An identification signal and time-interval signal are inputted to detection identification control means 12 from image-forming control means 13, which is responsible for controlling the units surrounding the image-forming apparatus engine. Further, data corresponding to the binary signal (1 or 0) data 1 through n of the detection results of the respective detection means 11-1 through 11-*n* is supplied to image-forming control means 13 by way of detection identification control means 12** via one data line.

Figure 3:
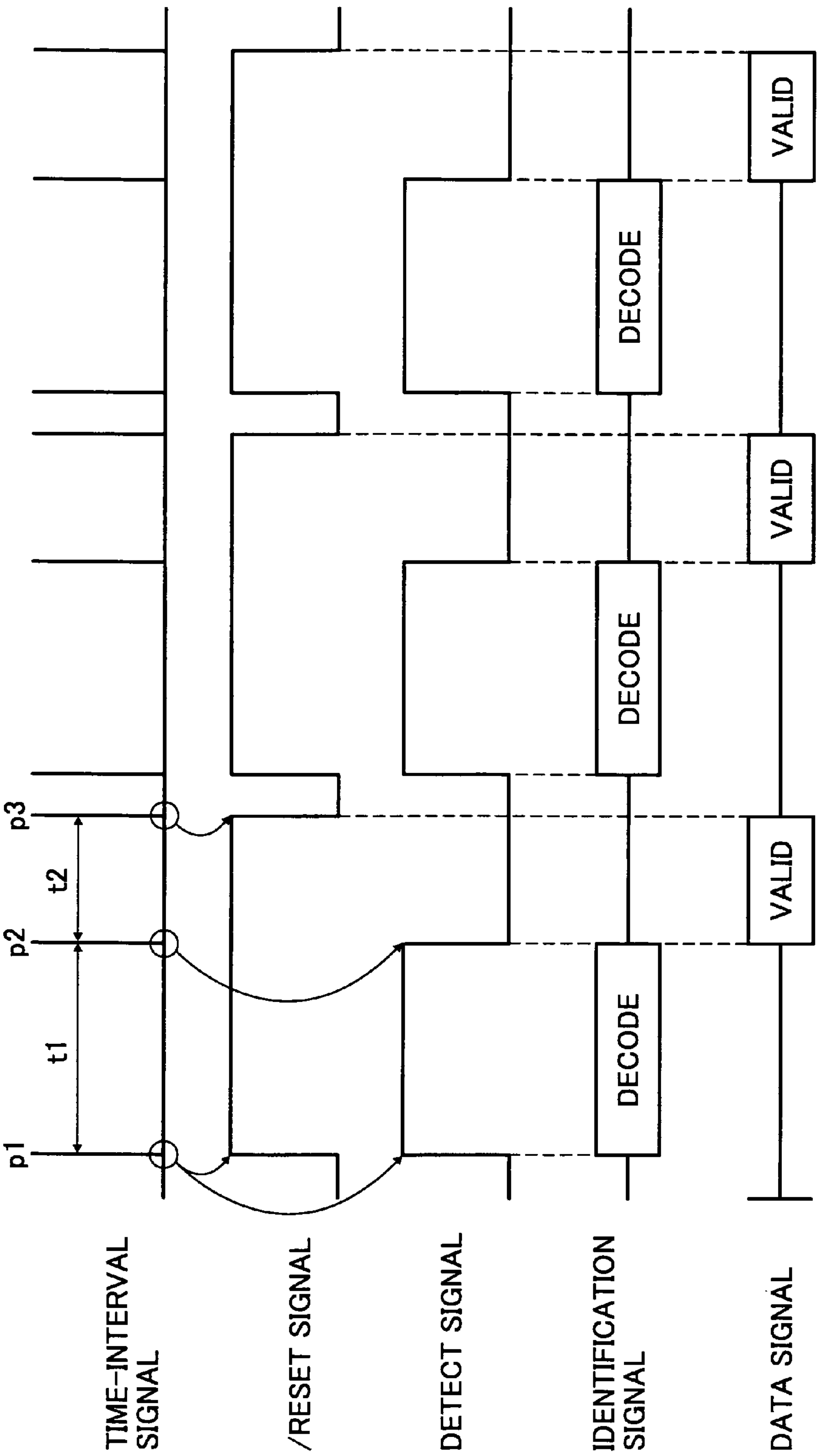
FIG. 3 is a timing chart showing intervals during which identification signals and data signals become valid as a result of time-interval signals.

FIG. 3 is a timing chart showing the intervals during which identification signals and data signals become valid as a result of time-interval signals. In this figure, a time-interval signal is pulses (p1, p2, p3) generated at certain established intervals (t1, t2). Detection identification control means 12 of FIG. 2 generates gate signals for a /Reset signal and a Detect signal from a generated time-interval signal, and from the two gate signals specifies a time-interval (decode) during which an identification signal becomes valid, and a time-interval (valid) during which a data signal becomes valid. Detection identification control means 12 of FIG. 2 identifies, from among the plurality of detection means 11-1 through **11-*n* of FIG. 2, detection means to be targeted based on an identification signal of a validation time-interval as in FIG. 3, and outputs over the data line of FIG. 2 the detection results of the pertinent detection means for a time-interval during which a data signal of FIG. 3 becomes valid. Then, image-forming control means 13 of FIG. 2 captures as the detection result of the pertinent detection means the data outputted over the data line during a validation time-interval (valid) of FIG. 3**, and reflects same in an image-forming operation.

Here, a time-interval signal of FIG. 3 is repeatedly outputted by treating pulse signals (p1, p2, p3) as a single group. After validating the identification signal on the identification line during time-interval t1 determined by p1 and p2, the time-interval signal validates the data on the data line during time-interval t2 determined by p2 and p3. The interval between p3 and the subsequent p1 is decided by a request from image-forming control means 13 of FIG. 2. When the detection results of the respective detection means 11-1 through **11-*n* of FIG. 2 are regularly captured, a p1 through p3** pulse train is repeatedly transmitted as a certain prescribe time-interval. Further, when these detection results are only captured randomly as needed, this time-interval time is not particularly established.

Figure 4:
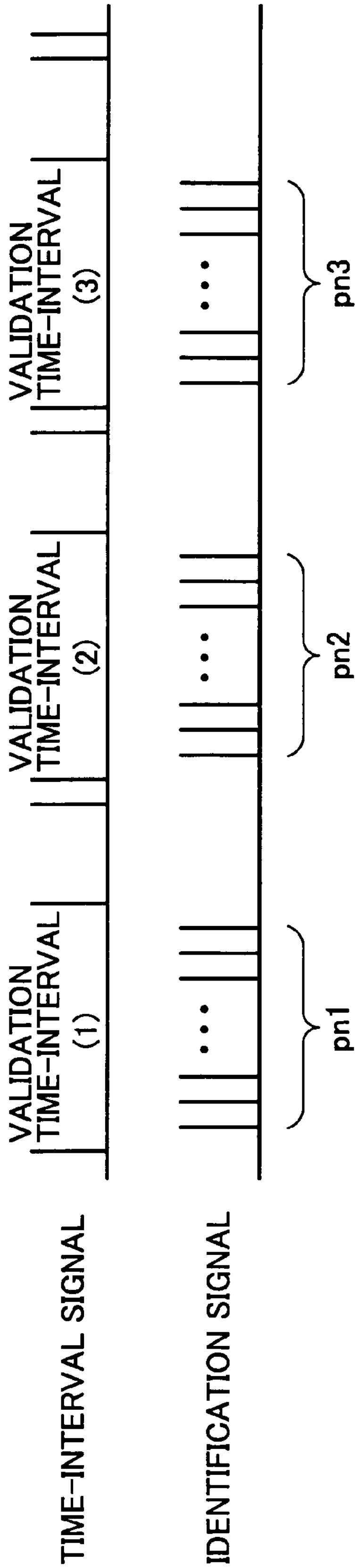
FIG. 4 is a timing chart showing the relationship between identification signals and time-interval signals in the present invention.

FIG. 4 is a timing chart showing the relationship between identification signals and time-interval signals in the present invention. In the figure, detection identification control means 12 of FIG. 2 identifies pertinent detection means from among detection means 11-1 through **11-*n*, which need to be identified, by counting the number of pulses of the identification signal generated within an identification signal validation time-interval. For example, when the number of pulses of an identification signal in validation time-interval (1) is pn1, the identification signal identifies and selects detection means 11-1, and when the number of pulses in validation time-interval (2) is pn2, the identification signal selects detection means 11-2, and so forth, thus predetermining detection means to be identified by detection identification control means 12 of FIG. 2**.

Figure 5:
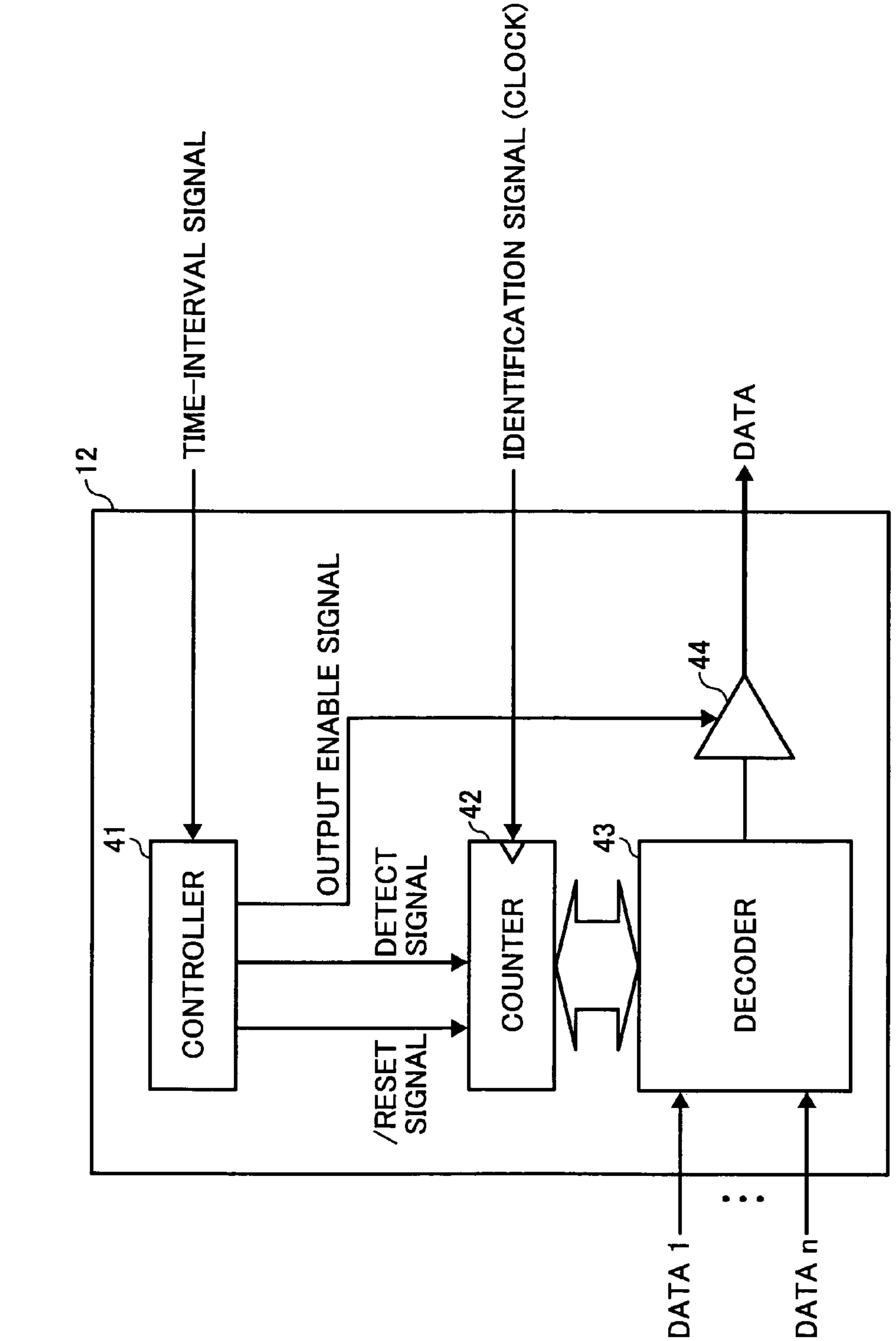
FIG. 5 is a block diagram showing the configuration of the detection identification control means of FIG. 2.

FIG. 5 shows the configuration of detection identification control means of FIG. 2. In this figure, a controller 41, upon receiving a time-interval signal of FIGS. 3 and 4, generates a /Reset signal and a Detect signal as shown in FIG. 3. Further, the controller 41 also generates an output enable signal, which validates data on the data line. A counter 42 counts the number of pulses, which is identification data of the identification line, within the validation time-interval of an identification signal, which is determined by the /Reset signal and Detect signal generated by the controller 41, and outputs a count value to a decoder 43. In accordance with the count value, the decoder 43, to which the data lines of the plurality of detection means are inputted, identifies and selects the data of one detection means, which has been predetermined from data 1 through n inputted via the plurality of data lines. The selected data is outputted by an output enable signal over a data line connected to image-forming control means 13 of FIG. 2 by way of a buffer 44.

As another identification method, a method for carrying out identification by varying the pulse width (P.W. M) of a single pulse instead of counting a number of pulses can also be considered here, but in this case, an oscillator or other such time measuring device is required on the detection identification control means side. Further, a method, which provides a capacitor or other such load storage means on the detection identification control means side, and carries out identification based on an analog voltage value by using pulse widths to control capacitor charging time, can also be cited, but accurate, reliable identification becomes impossible when a large number of means are to be identified. There is a typical multiplexer system for selecting one signal from a plurality of signals, but with this system the number of identification signal lines increases as the number of shared signals rises. For 2 to the nth power of signal lines, n-bits worth of lines are needed. Furthermore, when a small number of signals are to be shared, reducing the number of signal lines has no effect. For example, when there are five signal lines, three bits are needed as identification lines, and since one line is a data line, there is a total of four lines in all, making it possible to reduce only one line.

As described hereinabove, the time-interval t1 for validating an identification signal is treated as an established time, but time-interval t1 can also be arbitrarily set in accordance with detection means to be targeted. When a pulse, which is an identification signal, can identify a targeted means using a small number of pulses, the identification signal validation time-interval t1S is shortened, and when identifying a targeted means with a large number of pulses, the identification signal validation time-interval t1L is lengthened. For example, when the relationship of the number of identification pulses Na, Nb, Nc for identifying three detection means Da, Db, Dc is Na<Nb<Nc, the lengths of the identification signal validation time-intervals Ta, Tb, Tc for identifying the respective detection means becomes Ta<Tb<Tc. Here, the pulse time-interval of an identification signal is fixed.

Now then, when a large number of detection means share a data line, problems arise when a detection means must have its status regularly monitored. Accordingly, when the cycle for identifying detection means, which requires regular status detection, becomes long, the time-interval for making an identification signal valid and the time for making data valid are shortened so that detection means is identified in the time-interval deemed necessary. In this case, the pulse time-interval of the identification signal is also shortened if necessary. Further, by contrast, when few detection means are sharing a data line, a time-interval signal is generated and transmitted so as to ensure that both the identification interval and data validation time-interval are of sufficient duration. Furthermore, in this embodiment, the pulse time-interval of an identification signal will change in accordance with the number of detection means sharing a data line.

Figure 6:
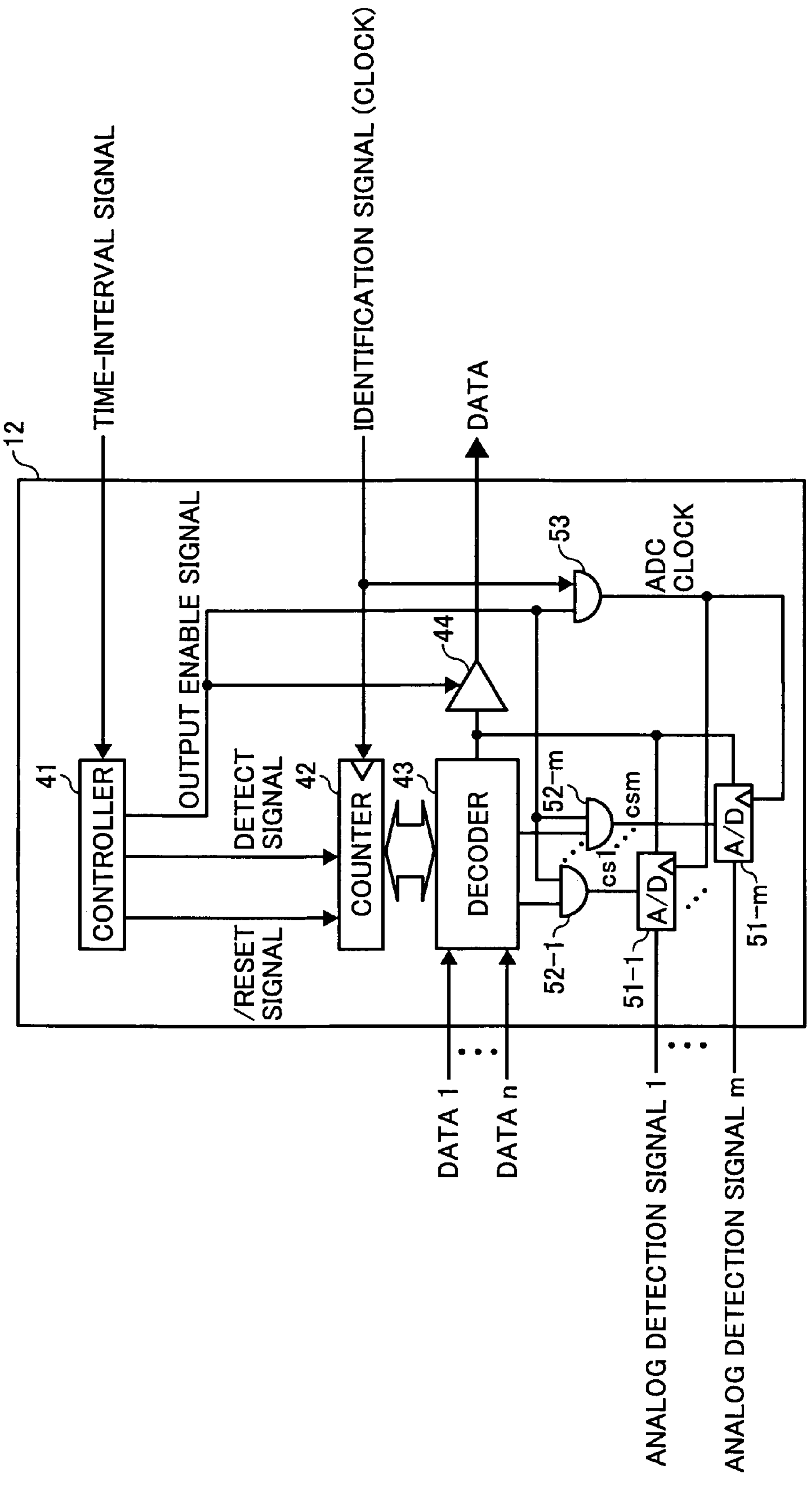
FIG. 6 is a block diagram showing another configuration of the detection identification control means.
Figure 7:
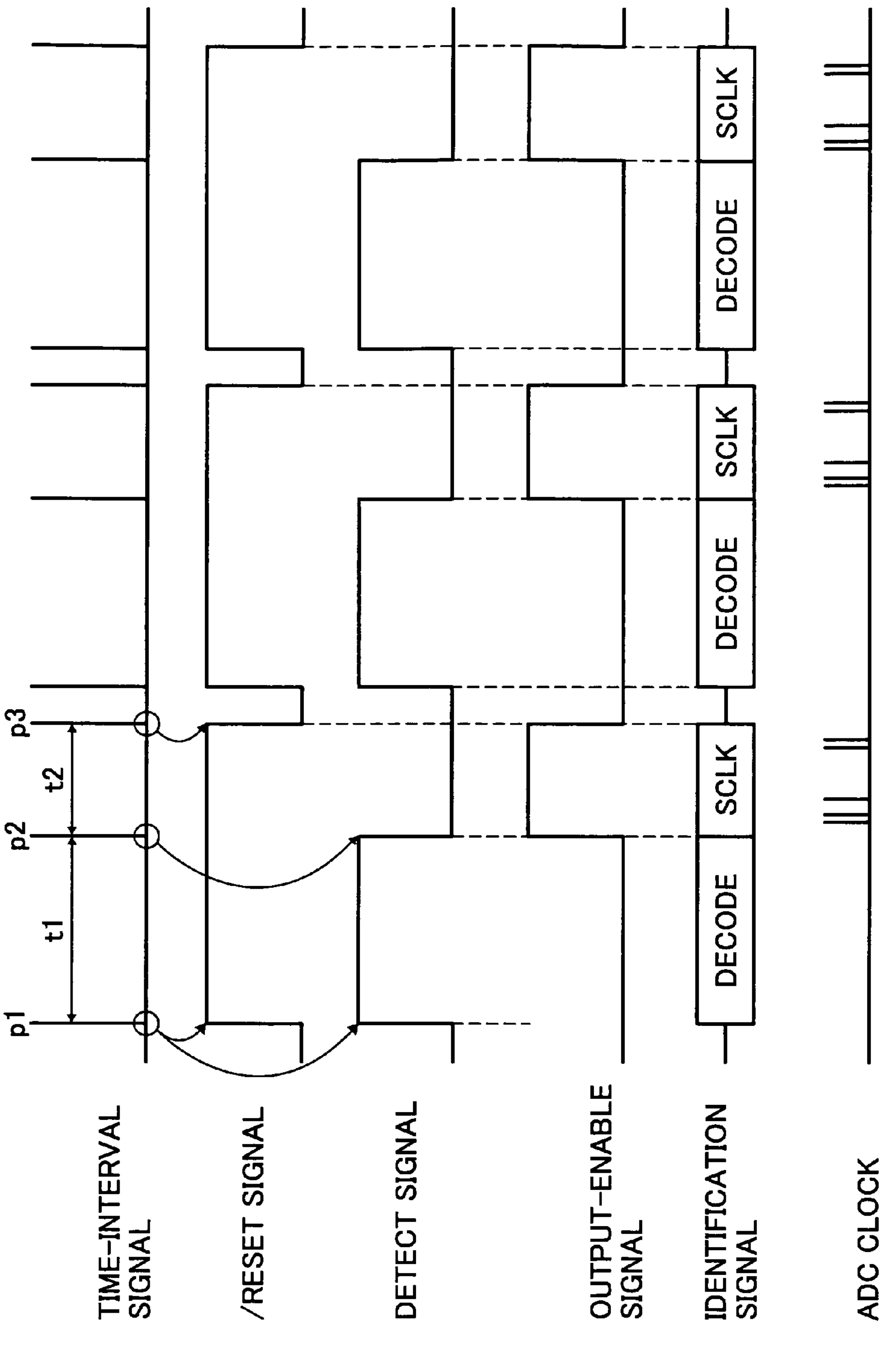
FIG. 7 is a timing chart showing the intervals during which identification signals and data signals become valid as a result of time-interval signals.

FIG. 6 shows another configuration of the detection identification control means of FIG. 2. FIG. 7 is a timing chart showing the intervals during which identification signals and data signals become valid as a result of a time-interval signal. In FIG. 6, the same reference numerals as in FIG. 5 will be used to describe like elements.

Detection identification control means 12 shown in FIG. 6 is provided with a plurality of A/D converters 51-1 through 51-*m* (where m is a positive integer), and with a function for validating a signal (clock) of the identification signal line for a data validation time-interval specified by a time-interval signal, enabling image-forming control means to capture analog detection signals 1 through m, which are the detection results of a plurality of analog detection means (not shown in the figure), via a single shared data line. Detection identification control means 12 shown in FIG. 6 provides a plurality of AD converters 51-1 through 51-*m*, and AND circuits 52-1 through 52-*m*, which generate logical products with output enable signals, which indicate data validation time-intervals comprising /Reset signals and Detect inverse signals, to signals, which identify and select detection means made valid by the decoder 43. At the same time that the detection identification control means 12 is identifying and selecting a single AD converter by treating the respective outputs of the AND circuits 52-1 through 52-*m* as chip select signals (CS 1 through CS m signals) of the AD converters 51-1 through 51-*m*, it also validates an identification signal (clock), which is transmitted in the data validation time-interval shown in FIG. 7, as an AD converter shift clock (SCLK). When the AD converters 51-1 through 51-*m* are 8 bits, a clock is transmitted over the identification line such that the 8-bit data of the identified AD converter is outputted on the data line of a data validation time-interval.

Now, there are detection means for various apparatus statuses, such as door open/closed, devices of the respective replaceable (expendable) units, toner concentration level, and the size and arrangement of recording media (paper), and these detection means are arranged by either the location or unit in which detection means is positioned, and divided into a plurality of groups. A bundle of signal lines (a data line, identification signal line, time-interval signal line) and a detection identification control means are provided to constitute a detection means data controller for each of the plurality of detection means groups divided up (arranged) as described hereinabove. For example, the toner cartridge unit has four toner cartridge installation detection means (Y, M, C, K) and four toner end detection means (Y, M, C, K). Even if the cartridge installation detection means are switches, and the toner end detection means are sensors, i.e. different detection systems, the detection results use the same either 5V or 3.3V binary signals. Accordingly, the above-mentioned eight detection means of the toner cartridge unit are arranged into a single detection means group, a detection identification control means is provided inside the toner cartridge unit, and a data line, identification signal line and time-interval signal line are connected thereto.

Further, in addition, the paper feeding unit also has a plurality of detection means, such as paper size detection means, remaining amount of paper detection means, and paper supply cassette installation detection means, and these are arranged into one detection means group to make a single detection means data controller. Since the statuses detected by the above-mentioned detection means do not have to be detected simultaneously, and further, since there is no need for immediateness when detection results are requested during an image-forming operation, it is possible to make shared use of the data line.

THE EFFECTS OF THE PRESENT INVENTION ARE AS FOLLOWS (1) Enables the number of input lines required by an image-forming apparatus to be reduced using a simple constitution.

(2) Makes it possible to reliably acquire the detection results of an identified detection means.

(3) Makes it possible to identify pertinent detection means from a plurality of detection means using a simple constitution.

(4) Enables efficient identification even when the number of shared detection means increases.

(5) Enables the identification of detection signals having a plurality of bits even when the detection signals are shared.

(6) Makes it possible to reliably obtain detection results without hindering an image-forming operation.

According to an image-forming apparatus of the present invention, it is possible to reduce the vast amounts of image-forming apparatus input lines by multiplexing detection data from a plurality of detection means on a single signal line, to provide versatility so as to be able to deal with changes in the image-forming system configuration without increasing the number of signal lines by making detection means identification signals redundant, and to hold down costs.

Various modifications will become possible for those skilled in the art after receiving the teachings of the present disclosure without departing from the scope thereof.

What is claimed is:

1. An image-forming apparatus, which has a plurality of detection means for outputting detection data comprising detection results of the operating statuses of a plurality of component members constituting the image-forming apparatus, and detection results of various types of detection sensors inside and outside of the image-forming apparatus, comprising:

one data line for supplying the detection data from the plurality of detection means to image-forming control means;

one identification signal line for supplying an identification signal, which specifies one detection means from among the plurality of detection means, from the image-forming control means;

one time-interval signal line for supplying a time-interval signal, which specifies a validation time-interval for the identification signal, and a validation time-interval for the detection data; and detection identification control means, which identifies a pertinent detection means based on the identification signal and the time-interval signal, validates only detection data of the identified pertinent detection means, and supplies the detection data to the image-forming control means via the data line.

2. The image-forming apparatus as claimed in claim 1, wherein the detection identification control means validates only detection data of the pertinent detection means identified by the identification signal subsequent to validating the identification signal.

3. The image-forming apparatus as claimed in claim 1, wherein the detection identification control means identifies the pertinent detection means by counting the number of pulses of the identification signal within a fixed time-interval during which the identification signal becomes valid.

4. The image-forming apparatus as claimed in claim 1, wherein the length of the time-interval during which the identification signal becomes valid is arbitrary.

5. The image-forming apparatus as claimed in claim 1, wherein the length of the time-interval, which specifies the identification signal and the detection data, is varied in accordance with the number of the detection means sharing one data line.

6. The image-forming apparatus as claimed in claim 1, wherein the detection identification control means is provided with an A/D converter for converting an analog detection signal outputted by analog detection means to a digital signal, and a logic circuit for validating an identification signal during a data validation time-interval, and validates detection data of a plurality of bits by means of the logic circuit as detection data of the analog detection means to be identified.

7. The image-forming apparatus as claimed in claim 1, comprising a plurality of detection data control means each having a bundle of signal lines comprising the data line, the identification signal line and the time-interval signal line, and the detection identification control means, the plurality of detection data control means being divided according to location or unit to which the detection means is installed or functionality of the detection means.

* * * * *